June 7, 1960   C. E. WARSAW   2,940,044
ROTARY MEASURING APPARATUS
Filed Sept. 8, 1958

INVENTOR.
CHARLES E. WARSAW
BY
ATTORNEY

United States Patent Office 2,940,044
Patented June 7, 1960

2,940,044
ROTARY MEASURING APPARATUS

Charles E. Warsaw, 2636 NE. 26th St., Pompano Beach, Fla.

Filed Sept. 8, 1958, Ser. No. 759,690

12 Claims. (Cl. 324—125)

This invention relates to improvements in rotary measuring apparatus, such as rotary power integrating meters, and more particularly relates to improved measuring apparatus wherein a constant increment representing non-useful power is subtracted from the gross input to the measuring apparatus so that the quantity measured and integrated will be a measure of the useful net power, the measuring apparatus being non-responsive to inputs below the amount of said increment.

This invention will be illustrated and described with reference to an electric integrating watt-hour meter such as is commonly employed to measure the input to an electric motor, the gross power input thereto being the sum of the useful power load and the tare load, the latter expression as used in this disclosure designating the non-useful energy required to overcome losses in the motor and in the associated mechanism under no-load conditions.

It is a principal object of this invention to provide in rotary measuring apparatus improved magnetic brake structure which is capable of performing two desirable functions, namely: (1) the subtraction from the gross input power when the measuring apparatus is rotating of a substantially constant increment representing the tare load; and (2) the stopping of the rotary measuring apparatus whenever the gross input thereto falls below a certain threshold amount, this amount generally being equal to the tare load increment, and the retaining of the apparatus in stopped condition until the said threshold is exceeded.

It is another major object of the invention to provide novel magnetic braking means in a work measuring organization, said braking means providing a nearly constant subtractive increment despite varying gross input to the apparatus, the improvement being attributable to a novel placement of stationary magnet poles and to permeable material applied to a rotary member of the measuring apparatus adjacent said magnetic poles.

Still another object of the invention is to provide convenient adjustment means for varying the tare increment for calibration purposes.

A further object of the invention is to provide in an electrical measuring meter magnetic brake means of the type described wherein the stray magnetic fields of the brake means have substantially no effect on the measuring circuits in the meter so that the calibrations of these latter circuits are not disturbed thereby.

Other objects and advantages of the invention will become apparent during the following discussion of the drawings wherein.

Figure 1:
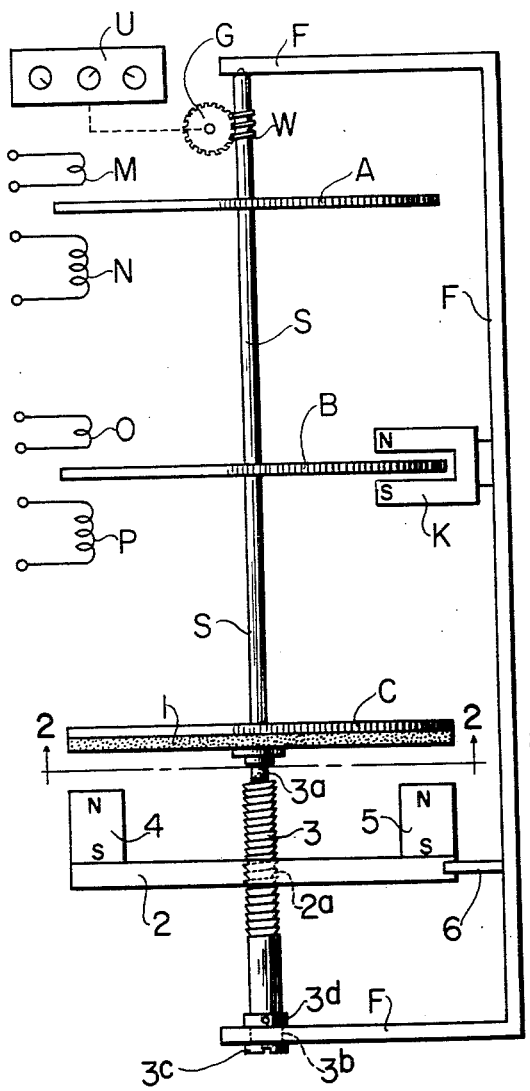
Fig. 1 is a schematic elevational view illustrating a polyphase meter of the type having three discs, the novel means of the present invention being added to the lowermost disc of this meter.

Referring now to the drawing, the meter shown in Fig. 1 comprises a frame F having upper and lower transverse portions adapted to support the shaft S. The shaft S in turn supports three discs A, B and C, all of which are fixed to the shaft for unitary rotation therewith. At the upper end of the shaft S is a worm W which turns a worm gear G for the purpose of mechanically driving an integrating indicator unit U. The upper disc A has associated therewith current and voltage coils M and N, and the center disc B has another pair of similar coils O and P, these sets of coils turning the discs A and B and driving the meter for the purpose of measuring polyphase power in the well-known manner. The magnet K may also be included as a calibration expedient and is well-known in the art. The parts of the meter illustrated in Fig. 1 and described so far are conventional parts found in most polyphase integrating meters and therefore form no part of the present invention except in so far as they are claimed in combination with the novel structure described hereinafter.

Figure 2:
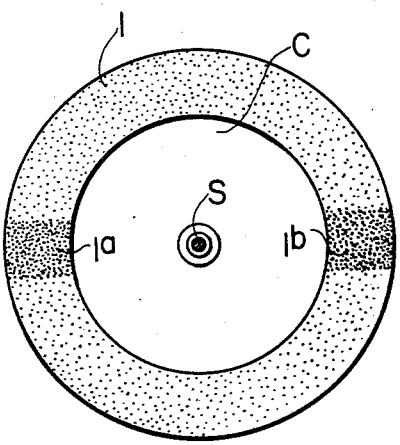
Fig. 2 is a view taken along line 2—2 of Fig. 1.
Figure 3:
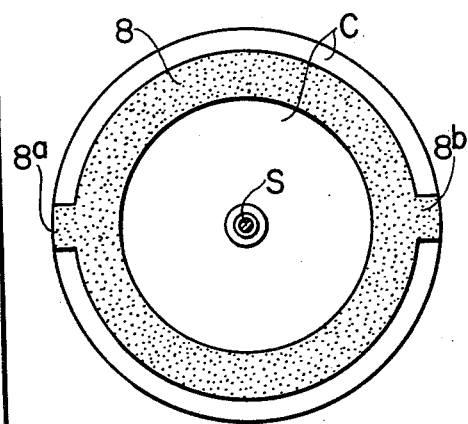
Fig. 3 is a view similar to Fig. 2 but showing a modified form of the invention.

The discs A, B and C are generally made of aluminum, and on the lowermost disc C there is added a coating of magnetically permeable material 1, this material being annularly distributed around the disc C on its lower surface as shown in Fig. 2. In the practical embodiment on which the present invention was developed, soft iron filings mixed in paint were spread on the lower surface of the disc C. As a practical matter, it has proven quite satisfactory to apply a number of coats of the paint with the filings suspended therein in order to build up a reasonable thickness thereof. The paint containing the filings suspended therein is illustrated in Figs. 1, 2 and 3 by stippling, the dots representing the particles.

Below the coating 1 on the bottom surface of the disc C there is a magnet assembly including a bar 2 having a threaded bore 2a therethrough. This bar is screwed down upon a lead screw 3 having a bearing 3a at its upper end in which the shaft S is journalled. The lower end of this lead screw 3 passes downwardly through a bore 3b in the frame F and terminates in a head 3c having a screw driver slot therein useful in turning the lead screw 3. A collar 3d above the frame F is retained on the lead screw by any convenient means such as a transverse pin therethrough, and this collar 3d plus the head 3c captivates the lead screw 3 in the frame and permits only rotation thereof as a feature of adjustment. If desired, appropriate locking means (not shown) may be applied between the lead screw and the frame F in order to positively prevent accidental rotation of the lead screw 3.

The bar 2 supports at its opposite ends magnets 4 and 5, these magnets each having a north pole and a south pole as illustrated in Fig. 1. A small extension 6 of the frame F may be employed to prevent rotation of the bar 2 around the lead screw 3 and with respect to the frame F, whereby when the lead screw 3 is rotated by means of a screw driver applied to the slot in the head 3c the bar 2 will move toward or away from the lower surface of the disc C for the purpose of increasing or decreasing the spacing to alter the influence of the magnets 4 and 5 on the permeable coating 1 around the bottom of the disc C. Referring to Fig. 2, it will be seen that the density of the permeable particles is not constant around the annular coating 1, but that the density of this material is altered in certain sectors of the disc C, for instance by altering the number of coats of paint or the particle density in the coats applied.

In the embodiment shown in Fig. 2, the density is increased at two diametrically opposite locations 1a and 1b. This change in total permeability of the material of the coating 1 is employed for the purpose of providing disc-stalling points, to be described in greater detail hereinafter.

Fig. 3 shows a modification of the coating on the underside of the disc C, this coating being designated generally by the reference numeral 8. In this modification the coating 8 has its total effective permeability varied with respect to the angular position of the disc C by varying the area of the coating 8 as at the diametrically opposite locations 8a and 8b. These area variations 8a and 8b serve the same purpose as the density variations 1a and 1b described in connection with the modification shown in Fig. 2.

*Operation*

The meter illustrated in Fig. 1 normally has its coils M, N, O and P connected to an external circuit using electric power, this circuit not being shown in the drawing.

When set in rotation by power applied to the discs through the windings M—N and O—P the meter shaft will be rotated and will drive the integrating unit U through the worm W and gear G. The calibration of the meter is assumed to have been made so that the measurements taken in the aforesaid manner will be accurate.

The rotation of the meter shaft S also causes rotation of the disc C and of the permeable coating 1 on the lower face thereof. As this coating 1 rotates the magnets 4 and 5 will cause a braking effect thereon and the extent of the braking effect can be adjusted by varying the spacing between the magnets 4 and 5 and the coating 1 by turning the lead screw 3 thereby causing the bar 2 to approach the lower surface of the disc C, or to recede therefrom.

It is a novel and obvious feature of the present invention that considerably better results are obtained when the magnets 4 and 5 present like poles to the coating 1 then when the magnets are arranged so that they present unlike poles to this coating. By considerably better results, it is meant that the amount of the increment which is actually subtracted from the meter reading is more nearly constant regardless of the speed of rotation of the shaft S when the magnets are arranged as shown in Fig. 1 than when they are arranged with the north pole presented to the permeable coating 1 on one magnet and the south pole presented thereto on the other magnet. This discovery was made during laboratory experimentation and appears to be attributable to the fact that the composite braking effect on the disc C is less speed sensitive when like poles are presented than it is when unlike poles are presented.

Consider for example the effect of the magnet K on the disc B where unlike poles are presented to the disc. As the disc B rotates these unlike poles of the magnet K generate eddy currents in the disc and the amount of eddy currents generated therein are proportional to the speed of the disc B as it rotates past the magnet. Thus, the faster the disc rotates the greater the eddy current losses in the disc and the greater the braking effect thereon. Therefore, the slowing effect of the magnet K on the disc B may be said to be proportional to the speed of the disc.

On the other hand, considering the effect of the magnets 4 and 5 on the permeable coating 1 and also on the disc C, it will be noted that because of the fact that like poles are presented toward the disc, the amount of eddy currents generated therein by the presence of the magnets 4 and 5 should be very small. Actual tests indicate that the effect is in fact so small as to be negligible. The result then is that the effect of the magnets 4 and 5 located in fairly close proximity to the disc C will not be proportional to the speed of rotation of the disc C in view of the fact that substantially no eddy currents are generated therein.

Therefore, the remaining effect of the magnets 4 and 5 on the rotation of the shaft S is the braking effect which they apply to the permeable coating 1. An important feature of the present invention is that eddy currents are also strongly discouraged in the coating 1 by the fact that the paint has an insulating effect which discourages the flow of such eddy currents from particle to particle in the permeable coating 1. Also the coating 1 has a tendency to shield the disc C from the effects of the magnetic fields of the magnets 4 and 5 by concentrating the flux below the disc and discouraging penetration of the flux field into the vicinity of the aluminum disc C. Thus, it will be seen that eddy currents will not be generated either in the disc C or in the permeable coating 1 to any appreciable extent and thus, the principal factor is removed which would otherwise tend to make the braking effect proportional to the speed of shaft rotation.

The magnetic attraction of the north poles of the magnets 4 and 5 on the permeable particles causes mechanical realignment of their poles and thus consumes energy which provides the braking action required to slow the disc sufficiently to subtract the tare increment from the total reading of the meter, and this attraction of the north poles for the magnetic particles is apparently not affected particularly by variations in rotational speed of the disc C.

It is to be pointed out that the system works just as well if the south poles of the magnets 4 and 5 are presented to the coating 1. Also the system operates reasonably well when the north pole of one magnet is presented to the permeable coating 1 and the south pole of the magnet is presented to this coating. However, in this latter case greater eddy currents are generated in the disc C and there is a noticeable component of the drag on the disc caused by these eddy currents which component is definitely speed sensitive. Therefore, it is recommended that the magnets 4 and 5 be oriented so that both present the same pole to the permeable coating 1.

With reference to Figs. 2 and 3 it will be seen that two different means are suggested for stopping the disc altogether when the power which the meter is measuring is below said threshold power. One way is to vary the composite density of the permeable material of the coating 1 in at least one location. It has been found expedient to use two opposite locations in order to take advantage of the fact that the structure shown in Fig. 1 includes two diametrically opposite magnets.

Alternatively, in the coating shown in Fig. 3 the area rather than the density of the coating is varied and this variation in area may also be made at one or more places around the periphery. Here again two diametrically opposite locations 8a and 8b are selected, although it is to be noted that any number thereof would prove satisfactory.

These variations for the purpose of allowing the magnets 4 and 5 to fully stop the disc will not contribute appreciably to the average amount of drag imposed on the disc when rotating past the magnets 4 and 5. This is attributable to the fact that as the more dense portions of the coating approach the magnets 4 and 5 there is greater attraction which tends to cause an acceleration of the disc, but as the denser portions recede from the magnets, there is a slowing effect on the disc, and since these effects are substantially equal and opposite, on an average basis they cancel out.

However, the variations in attraction with position of the disc serve the purpose of permitting the magnets to hold the disc in a stalled position since it requires a greater than average force to start the disc going after it is once stopped and the varied areas of the coating aligned with the magnets 4 and 5. In general, the amount of this additional force required to overcome the threshold imposed by the magnets 4 and 5 can be altered by altering the extent of the change in total permeability in the areas 1a and 1b or 8a—8b. In the case of the density variation, more or less permeable material may be applied in the areas 1a—1b but in the case of the area variations the extent of the area can be altered by changing the angular extent of the enlarged portions 8a—8b of the permeable coating.

It is not necessary that the rotary apparatus be an electric meter, for other types of rotary apparatus could be substituted for the electric meter shown in the drawing. In conducting the laboratory experiments mentioned above a three-disc electric power meter, Duncan Model MH–3PT, was used and the current and voltage coils were removed from the lowermost disc. The magnets were mounted as shown in the drawing below the lower face of the disc C in close proximity to the permeable material 1 comprising said iron filings suspended in paint and applied in a plurality of layers.

I do not limit my invention to the exact forms shown and described for obviously changes may be made therein within the scope of the claims.

I claim:

1. In power measuring apparatus having a rotor rotating at a rate proportional to the power being measured, means for subtracting from said rate a constant increment representing a non-useful component of said power and for holding said rotor stalled unless the power level exceeds a certain threshold, comprising an annular member of permeable material fixed to said rotor and concentric therewith, said material comprising permeable particles suspended in mutually-insulated relation in a nonconductive binder and at least one sector of said member having a total permeability different from that of other sectors; and magnet means positioned adjacent said permeable material, the flux therefrom interacting with the material in said annular member to retard the rotor and subtract said increment, and interacting with the material in said sector to stall said rotor when the power level is below said threshold.

2. In apparatus as set forth in claim 1, said rotor comprising a meter disc and said material being applied on one face thereof, and said magnet means each having two poles and each positioned with the same pole adjacent said material and the other pole remote therefrom.

3. In apparatus as set forth in claim 2, said other poles being joined together by a bar of magnetic material.

4. In apparatus as set forth in claim 2, said magnet means being supported by a mounting means adjustably movable axially of said disc.

5. In apparatus as set forth in claim 1, said sectors of different permeability comprising sectors of the ring wherein the particle density is increased.

6. In apparatus as set forth in claim 5, said sectors of different permeability comprising sectors of the ring wherein the area covered by said particles is increased.

7. In power measuring apparatus having a rotor rotating at a rate proportional to the power being measured, means for subtracting from said rate a constant increment representing a non-useful component of said power, comprising an annular member of permeable material fixed to said rotor and concentric therewith; and magnet means each having two poles and each magnet means being positioned with one pole adjacent said permeable material and the other pole remote therefrom, the poles adjacent said permeable material all having the same polarity and the poles remote therefrom all being of the opposite polarity, and the flux from said adjacent poles interacting with the material in said member to retard the rotor and subtract said increment.

8. In apparatus as set forth in claim 7, said material comprising permeable particles suspended in mutually-insulated relation in a nonconductive binder.

9. In apparatus as set forth in claim 7, said rotor comprising a meter disc and said material being applied to one face thereof, and said magnet means being supported by a mounting means adjustably movable axially of said disc on the same side as said face.

10. In power measuring apparatus having a rotor rotating at a rate proportional to the power being measured, means for subtracting from said rate a constant increment representing a non-useful component of said power, comprising an annular member of discrete mutually-insulated permeable particles fixed to said rotor and concentric therewith; and magnet means positioned adjacent said permeable material, the flux therefrom interacting with said particles to retard the rotor and subtract said increment.

11. In apparatus as set forth in claim 10, said annular member comprising a ring of said material having sectors of different permeability wherein the particle density is varied.

12. In apparatus as set forth in claim 10, said annular member comprising a ring of said material having sectors of different permeability wherein the area covered by said particles is varied.

References Cited in the file of this patent

UNITED STATES PATENTS

| | | |
|---|---|---|
| 591,898 | Thomson | Oct. 19, 1897 |
| 701,718 | Hall | June 3, 1902 |
| 2,099,849 | Holmes | Nov. 23, 1937 |
| 2,622,707 | Faus | Dec. 23, 1952 |

FOREIGN PATENTS

| | | |
|---|---|---|
| 12,546 | Great Britain | June 28, 1895 |

UNITED STATES PATENT OFFICE
CERTIFICATE OF CORRECTION

Patent No. 2,940,044

June 7, 1960

Charles E. Warsaw

It is hereby certified that error appears in the printed specification of the above numbered patent requiring correction and that the said Letters Patent should read as corrected below.

Column 3, line 34, for "obvious" read -- unobvious --; line 37, for "then" read -- than --.

Signed and sealed this 3rd day of January 1961.

(SEAL)
Attest:

KARL H. AXLINE
Attesting Officer

ROBERT C. WATSON
Commissioner of Patents